United States Patent [19]

Flament

[11] 4,233,332
[45] Nov. 11, 1980

[54] USE OF BICYCLIC NITROGEN-CONTAINING DERIVATIVES AS FLAVORING INGREDIENTS

[75] Inventor: Ivon Flament, Geneva, Switzerland

[73] Assignee: Firmenich SA, Geneva, Switzerland

[21] Appl. No.: 16,405

[22] Filed: Mar. 1, 1979

[30] Foreign Application Priority Data

Mar. 16, 1978 [CH] Switzerland .................. 2863/78

[51] Int. Cl.³ .............................................. A23L 1/231
[52] U.S. Cl. .................................. 426/537; 131/17 R
[58] Field of Search ......................... 426/537; 546/122

[56] References Cited

U.S. PATENT DOCUMENTS 3,702,253  11/1972  Winter ................................. 426/537
4,005,227   1/1977  Winter ................................. 426/537

OTHER PUBLICATIONS

C.A.–vol. 53 (1959): 371(d).

Primary Examiner—Joseph M. Golian
Attorney, Agent, or Firm—Pennie & Edmonds

[57] ABSTRACT

Bicyclic nitrogen-containing derivatives of formula

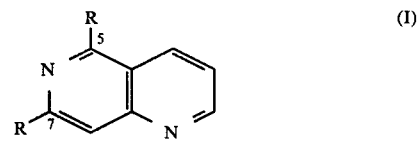

wherein each of symbols R represents a lower alkyl radical or a hydrogen atom, or one of them a lower alkyl radical and the other a hydrogen atom find a useful application as flavoring agents for foodstuffs in general. Their use is particularly interesting for conferring gustative notes of burnt and animal type, namely to meaty products.

3 Claims, No Drawings

USE OF BICYCLIC NITROGEN-CONTAINING DERIVATIVES AS FLAVORING INGREDIENTS

THE INVENTION

The present invention relates to a process for enhancing, improving or modifying the organoleptic properties of materials selected from the group consisting of foodstuffs, beverages, pharmaceutical preparations and tobacco products, which process comprises the step of adding thereto a small but flavouring effective amount of a compound of formula

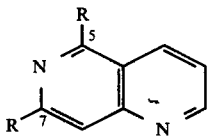

(I)

wherein each of symbols R represents a lower alkyl radical or a hydrogen atom, or one of them a lower alkyl radical and the other a hydrogen atom.

The instant invention relates also to a flavouring composition which comprises having added thereto a compound of formula (I).

Further this invention provides a foodstuff or a beverage containing a flavouring effective amount of a compound of formula (I).

Finally, it is an object of the present invention to provide a meaty or meat-imitating edible material containing a flavouring effective amount of a compound of formula (I).

PREFERRED EMBODIMENTS OF THE INVENTION

As indicated above, symbols R can represent a lower alkyl radical. Preferably, R designates an alkyl radical containing from 1 to 3 carbon atoms, e.g. methyl, ethyl, propyl or isopropyl. According to a preferred embodiment of the present invention, particularly useful effects are achieved by the use of the compounds of formula (I) wherein one of the R substituents defines a methyl radical and the other a hydrogen atom, or wherein each of them represents a hydrogen atom. These latter compounds, defined as 5-methyl-1,6-naphtyridine, 7-methyl-1,6-naphthyridine and 1,6-naphthyridine, respectively, are known chemical units [see e.g. Chem. Pharm. Bull. (Tokyo) 6, 263-9 (1958) as reported in Chem. Abstr. 53, 371 d (1959)]; their organoleptic properties however have not been mentioned sofar, nor has their possible utility as flavouring agents been suggested.

I have now discovered that the compounds of formula (I) develop useful organoleptic properties. Namely, they confer gustative notes of animal and burnt character to the products into which they are incorporated. These characters are particularly sought in the process of aromatization of meat or meaty edible material in general. On the other hand, the utilization of the compounds of formula (I) in accordance with the invention can be extended to a variety of foodstuffs other than meat, particularly in order to confer to them a roasted, torrified or burnt gustative character.

The compounds of formula (I) can be used on their own as flavouring agents, or in compositions comprising one or more other flavouring coingredients, in the form of diluted or concentrated solutions in the solvents commonly employed for this purpose, such as ethanol, triacetine and diethylene glycol. They can be added to the products to be flavoured at any convenient stage during the processing of these products and can be added to foodstuffs before or immediately after cooking. Furthermore, instead of using a compound of formula (I), it is sometimes convenient to use a precursor thereof which will yield this compound during the subsequent processing of the flavoured product.

The concentrations at which the flavouring agents of formula (I) are used can vary widely, depending on the specific organoleptic effect it is desired to achieve and the type of material to which they are added.

Interesting flavouring effects can generally be achieved with concentrations of from about 5 to about 100 ppm (parts per million) by weight, based on the total weight of the flavoured material. It is to be understood however that the said concentration values have not to be interpreted in a restrictive way and higher concentrations can be used for special purposes.

The compounds of formula (I) can be prepared in accordance with current synthetic methods, viz. following the method described in Chem. Abstr. 53, 371 d (1959) or Chem. Comm. 3 (1967).

The invention is better illustrated by but not limited to the following examples.

EXAMPLE 1

The gustative evaluation of 1,6-naphtyridine and 5-methyl-1,6-naphtyridine has been carried out by adding the said compound to a 0.5% aqueous NaCl solution at a concentration of 15 and 30 ppm by weight, respectively, based on the total weight of the flavoured solutions.

The taste of the beverages thus obtained was judged as being burnt and animal.

EXAMPLE 2

A simulated beef broth was prepared by mixing the following ingredients (parts by weight):

| Commercial beef gravy | 100 |
|---|---|
| Monosodium glutamate | 10 |
| Sodium 5-inositate and sodium guanilate (50:50) | 0.05 |
| Sodium chloride | 80 |
| Lactic acid | 5 |
| Water | to make 10 liters |

Two test compositions were prepared by separately adding to 1 litre of this broth 10 ppm of 1,6-naphtyridine and 25 ppm of 5-methyl-1,6-naphtyridine. These flavoured compositions were organoleptically evaluated by a panel of flavour experts by comparison with an unflavoured broth sample. The majority of the panel thought that the test compositions possessed a burnt-animal taste.

What I claim is:

1. A process for enhancing, improving or modifying the organoleptic properties of materials selected from foodstuffs and beverages, which process comprises the step of adding thereto a small but flavouring effective amount of a compound of formula

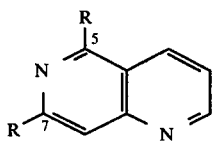

[(I)]

wherein each of symbols R represents a lower alkyl radical or a hydrogen atom or one of them a lower alkyl radical and the other a hydrogen atom, to impart a gustative note of animal or burnt character to said foodstuff or beverage.

2. A foodstuff or a beverage containing a small but flavouring effective amount of a compound of the formula as set forth in claim 1 to impart a gustative note of animal or burnt character to said foodstuff or beverage.

3. A meaty or meat-imitating edible material containing a small but flavouring effective amount of a compound of the formula as set forth in claim 1 to impart a gustative note of animal or burnt character to said material.

* * * * *